(12) United States Patent
Shimura

(10) Patent No.: US 6,839,034 B2
(45) Date of Patent: Jan. 4, 2005

(54) PROTECTIVE CUSHION FOR PORTABLE UNIT WITH BUILT-IN ANTENNA

(75) Inventor: Tokio Shimura, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/694,002

(22) Filed: Oct. 28, 2003

(65) Prior Publication Data

US 2004/0085251 A1 May 6, 2004

(30) Foreign Application Priority Data

Oct. 31, 2002 (JP) ........................................ 2002-318080

(51) Int. Cl.[7] ............................ H01Q 1/24; H01Q 1/42
(52) U.S. Cl. ........................................ 343/702; 343/872
(58) Field of Search ................................ 343/702, 872, 343/711, 712; H01Q 1/24, 1/42

(56) References Cited

U.S. PATENT DOCUMENTS 6,157,348 A * 12/2000 Openlander ................. 343/846
6,252,556 B1 * 6/2001 Ito et al. ..................... 343/770

FOREIGN PATENT DOCUMENTS

JP         62-196408          12/1987
JP         2002-70373          3/2002

* cited by examiner

Primary Examiner—Hoanganh Le
(74) Attorney, Agent, or Firm—Posz & Bethards, PLC

(57) ABSTRACT

A protective cushion is provided which works to absorb accidental physical impact acting on an antenna unit built in a portable unit such as a remote keyless entry transmitter for automotive vehicles. The protective cushion includes dampers each of which has a first and a second contact. The cushion is disposed within a casing in elastic abutment of the first contacts with the antenna unit and the second contacts with an inner surface of the casing, thereby absorbing physical impact transmitted to the antenna unit which is produced, for example, when the user drops the portable unit accidentally, thereby avoiding the detachment of the antenna unit from a circuit-fabricated substrate and/or breakage of the antenna unit itself.

19 Claims, 8 Drawing Sheets

| | Type 1 | Type 2 | Type 3 |
|---|---|---|---|
| Height H (mm) | 1.6 | 1.6 | 1.2 |
| Base Length L (mm) | 1.6 | 2.0 | 2.0 |
| Apical Angle θ (mm) | 53.1 | 64 | 79.6 |

PROTECTIVE CUSHION FOR PORTABLE UNIT WITH BUILT-IN ANTENNA

BACKGROUND OF THE INVENTION

1. Technical Field of the Invention

The present invention relates generally to a structure of a protective cushion used to absorb physical impact transmitted to an antenna unit built in a portable unit such as a remote keyless entry transmitter.

2. Background Art

A keyless entry system is known as one of automotive remote control systems. The keyless entry system usually has a wireless portable transmitter with a built-in antenna unit for use in establishing communication with the automotive vehicle. The antenna unit is relatively heavy in weight. Thus, if a user drops the transmitter accidentally together with an ignition key, it will cause the antenna unit to undergo a great physical impact, which may result in detachment of terminals of the antenna unit from a substrate and/or breakage of the antenna unit itself. In order to alleviate this problem, the antenna unit may be glued to the substrate tightly, which, however, requires an additional adhesive drying process, thus resulting in an increase in manufacturing cost of the transmitter.

SUMMARY OF THE INVENTION

It is therefore a principal object of the invention to avoid the disadvantages of the prior art.

It is another object of the invention to provide a cushion working to absorb accidental physical impact transmitted to an antenna built in a portable unit such as a wireless transmitter to improve a shock resistance of the portable unit and/or a portable unit equipped with such a cushion.

According to one aspect of the invention, there is provided a protective cushion working to absorb accidental physical impact acting on a portable unit such as a remote keyless entry transmitter for automotive vehicles which includes a casing having an inner surface, a substrate disposed within the casing on which an electric circuit is mounted, and an antenna unit disposed within said casing which includes a package. The package has a first and a second surface. The first surface extends parallel to a surface of said substrate. The second surface extends parallel to the inner surface of said casing. The package is affixed to the surface of said substrate at a plurality of joints provided symmetrically with respect to a preselected point defined on the first surface of the package. The protective cushion comprises: (a) dampers made of an elastic material which work to absorb physical impact transmitted to the antenna unit; (b) first contacts provided on said dampers, respectively; and (c) second contacts provided on said dampers which abut to the inner surface of the casing. The first contacts abut to the second surface of the package of the antenna unit at locations defined symmetrically with respect to the preselected point.

Specifically, the cushion is disposed within a parallel rectangular chamber defined in the casing in elastic abutment of the first contacts with the antenna unit and the second contacts with the inner surface of the casing, thereby absorbing physical impact transmitted to the antenna unit which is produced, for example, when the user drops the portable unit accidentally, thereby avoiding the detachment of the antenna unit from the substrate and/or breakage of the antenna unit itself.

In the preferred mode of the invention, each of the dampers has a sectional area which is geometrically symmetric with respect to a center line of said damper extending through the first and second contacts when no load is applied to the damper.

The second contacts abut to the inner surface of the casing at locations defined symmetrically with respect to the preselected point.

At least one of a set of said first contacts and a set of said second contacts geometrically defines one of a first configuration and a second configuration. The first configuration is circular. The second configuration has a first pair of sides extending parallel to each other and a second pair of sides extending parallel to each other on a plane extending perpendicular to the center line.

Each of said dampers is of an isosceles triangular shape in cross section. Each of the first contacts is defined by an apex of the isosceles triangular shape.

The protective cushion further includes a parallel mount plate placed in abutment with one of the second surface of the package and the inner surface of said casing. The second contacts are formed integrally with the mount plate.

An apical angle the isosceles triangular shape lies within a range of 45° to 60°.

The dampers and said first and second contacts are formed by an elastic member which is made of a silicone rubber having a Shore harness lying within a range of 30 to 50.

The casing is made up of a first and a second cover. The second cover has the inner surface on an inner wall thereof. The first and second covers are fitted tightly to each other at peripheries thereof to form a nip in which a waterproof seal is so disposed as to produce an elastic reaction force. The dampers are disposed in a nip formed by the second surface of the package and the inner surface of the casing so as to produce an elastic reaction force which is lower than the elastic reaction force produced by the waterproof seal.

The dampers and said first and second contacts may be formed by an elastic member implemented by an O-ring.

According to the second aspect of the invention, there is provided a portable unit such as a remote keyless entry transmitter which comprises: (a) a casing having an inner surface: (b) a substrate disposed within said casing on which an electric circuit is mounted: (c) an antenna unit disposed within said casing, said antenna unit including a package, the package having a first and a second surface, the first surface extending parallel to a surface of said substrate, the second surface extending parallel to the inner surface of said casing, the package being affixed to the surface of said substrate at a plurality of joints provided symmetrically with respect to a preselected point defined on the first surface of the package; and (d) a cushion disposed within said casing to absorb physical impact transmitted to said antenna. The cushion is made of an elastic material and equipped with dampers each of which has a first contact and a second contact. The first contacts abut to the second surface of the package of said antenna unit at locations defined symmetrically with respect to the preselected point. The second contacts abut to the inner surface of said casing.

In the preferred mode of the invention, each of said dampers has a sectional area which is geometrically axisymmetric when no load is applied to the damper.

The second contacts abut to the inner surface of said casing at locations defined symmetrically with respect to the preselected point.

Each of said dampers is of an isosceles triangular shape in cross section. Each of the first contacts is defined by an apex of the isosceles triangular shape.

The cushion has a parallel mount plate placed in abutment with one of the second surface of the package and the inner surface of said casing. The second contacts are formed integrally with the mount plate.

An apical angle the isosceles triangular shape lies within a range of 45° to 60°.

The cushion is made of a silicone rubber which has a Shore harness lying within a range of 30 to 50.

The casing is made up of a first and a second cover. The second cover has the inner surface on an inner wall thereof. The first and second covers are fitted tightly to each other at peripheries thereof to form a nip in which a waterproof seal is so disposed as to produce an elastic reaction force. The dampers are disposed in a nip formed by the second surface of the package and the inner surface of the casing so as to produce an elastic reaction force which is lower than the elastic reaction force produced by the waterproof seal.

The dampers may be formed by an elastic member implemented by an O-ring.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
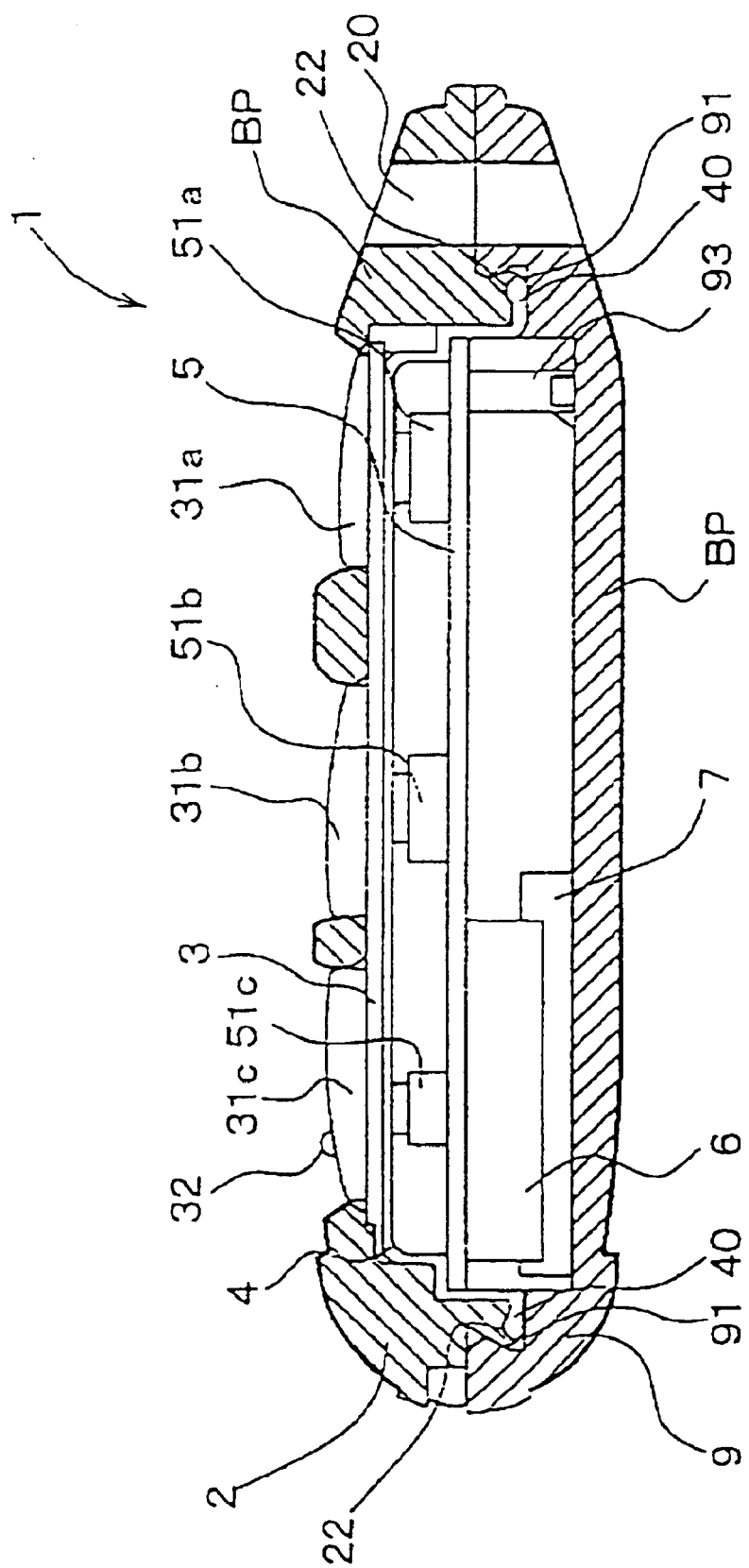
FIG. 1 is a longitudinal sectional view which shows a protective cushion disposed in a remote keyless entry transmitter according to the invention.
Figure 2:
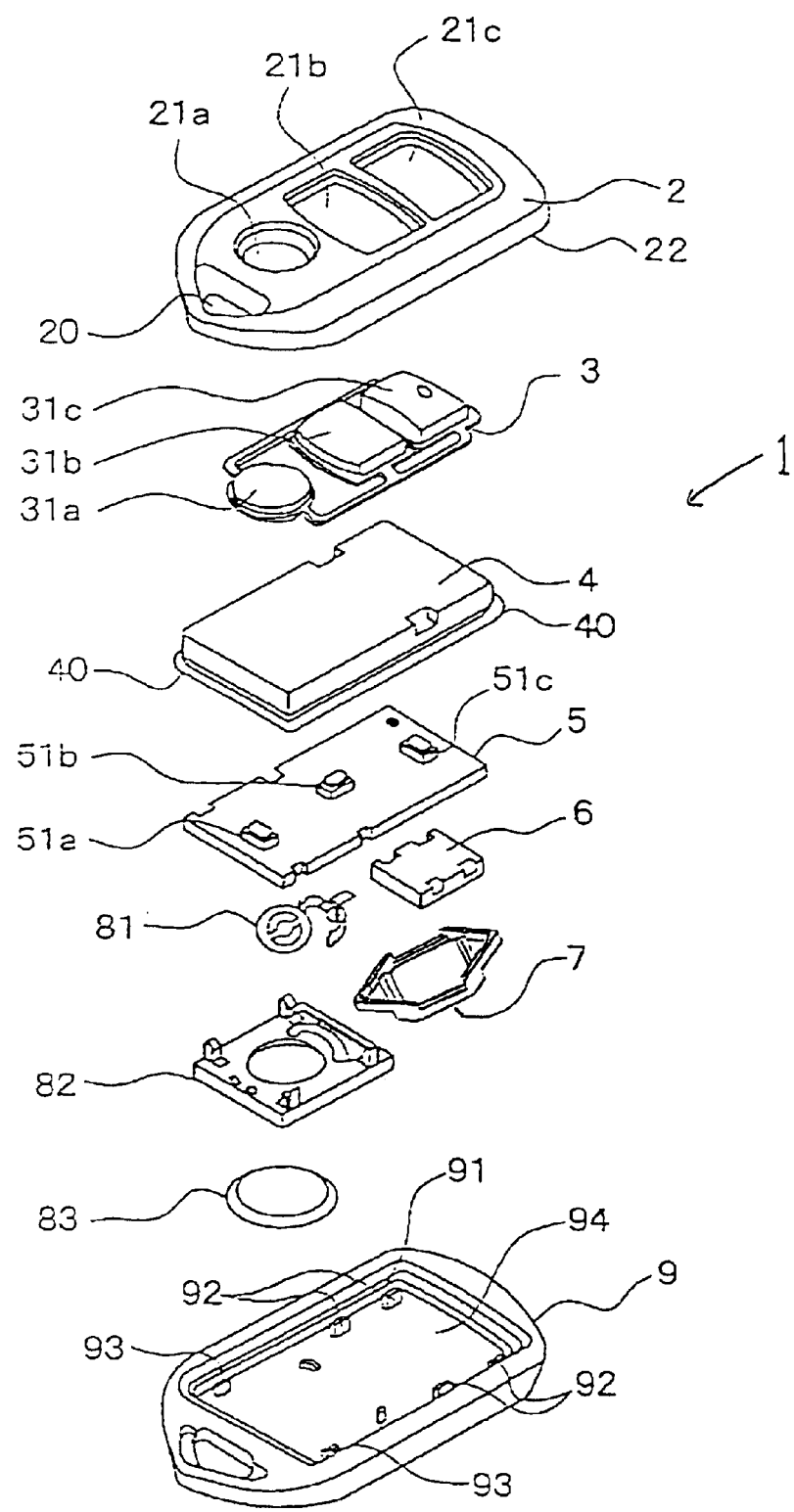
FIG. 2 is an exploded perspective view which shows the transmitter of FIG. 1.

Referring to the drawings, wherein like reference numbers refer to like parts in several views, particularly to FIGS. 1 and 2, there is shown a wireless portable unit 1 according to the invention. The wireless portable unit 1, as illustrated, works as a remote keyless entry (RKE) transmitter and will be referred to a transmitter 1 below. In the following discussion, portions of the transmitter 1 facing upward and downward, as viewed in the drawings, will be referred to as an upper portion and a lower portion below, respectively.

The transmitter 1 consists essentially of a casing made up of an upper cover 2 and a lower cover 9, a button panel 3, a waterproof cover 4, a circuit-fabricated substrate 5, depressable switches 51a, 51b, and 51c installed on an upper surface of the substrate 5, an antenna unit 6 installed on a lower surface of the substrate 5, a protective cushion 7 interposed between the antenna unit 6 and the lower cover 9 to absorb physical impact transmitted to the antenna unit 6, a battery terminal 81, a battery casing 82, a button battery 83, and spacers 91 to 93. The substrate 5 also has installed on the lower surface thereof transmitter circuits which are omitted from the drawing for the brevity of illustration.

The upper cover 2 is formed by a decorated resinous film disposed within a resinous base BP in an in-mold process. The resinous film has an upper surface on which a transparent protective coating is provided and a metallic or color-printed lower surface. The upper cover 2 has a key ring hole 20 and button holes 21a to 21c formed therein.

The button panel 3 has user depressable buttons 31a, 31b, and 31c formed on a decorated film like the upper cover 2. The buttons 31a to 31c are inserted into the button holes 21a to 21c of the upper cover 2 in one of assembling processes of the transmitter 1.

The waterproof cover 4 is made of silicone rubber and has an O-ring 40 formed integrally around the periphery thereof. The waterproof cover 4 is so installed as to surround the whole of an upper portion of the substrate 5. In the assembling process of the transmitter 1, the O-ring 40 is placed in a nip provided by a protrusion 22 formed on the upper cover 2 and a groove 91 formed in the lower cover 9 so that it is elastically deformed and works as a seal to avoid entrance of water into the casing.

The switches 51a to 51c are, as described above, installed on the upper surface of the substrate 5 and depressed or turned on or off by the buttons 31a to 31c. The antenna unit 6 is affixed to the lower surface of the substrate 5.

Figure 3A:
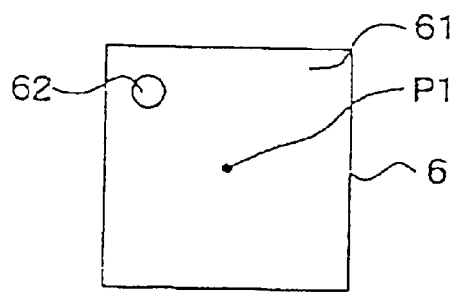
FIG. 3(a) is a top view which shows an antenna unit disposed within the transmitter of FIG. 1.
Figure 3B:
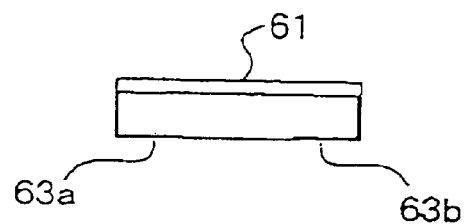
FIG. 3(b) is a side view of FIG. 3(a)
Figure 3C:
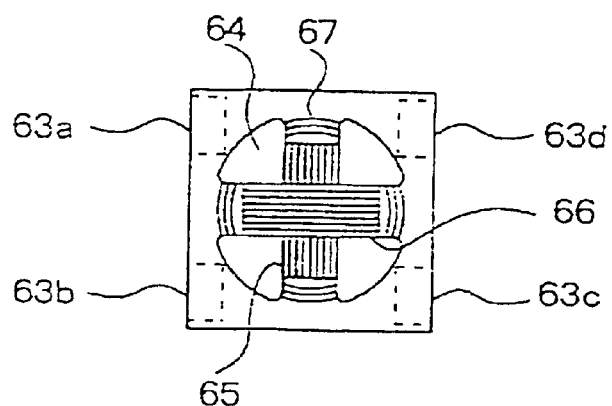
FIG. 3(c) is a bottom view of FIG. 3(a)
Figure 4:
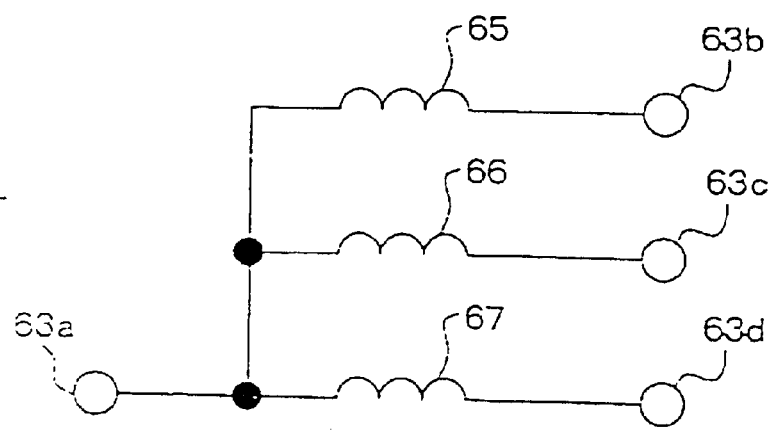
FIG. 4 is a circuit diagram which shows an equivalent circuit of the antenna unit as illustrated in FIGS. 3(a) to 3(c)

FIG. 3(a) is a plane view which shows a front surface 61 of a package of the antenna unit 6 which will also be referred to as a package surface below. FIG. 3(b) is a side view of FIG. 3(a). FIG. 3(c) is a view which shows an internal structure of the antenna unit 6. FIG. 4 is a diagram which shows an equivalent circuit of the antenna unit 6.

The antenna package is of a rectangular parallelepiped shape and has antenna terminals 63a, 63b, 63c, and 63d, as clearly shown in FIG. 3(c), affixed to four corners of a bottom surface thereof (i.e., a lower surface, as viewed in FIG. 3(b)) symmetrically with respect to the center P1, as indicated in FIG. 3(a), of the antenna package. The center P1, as illustrated on the package surface 61 in FIG. 3(a), coincides with the center of the bottom surface of the package of the antenna unit 6.

The antenna terminals 63a to 63d are soldered to selected portions of the lower surface of the substrate 5 in the assembling process of the transmitter 1 so that the package surface 61 is oriented parallel to the substrate 5 and an inner wall of the casing (i.e., the lower cover 9).

Internally, the antenna unit 6 includes a ferrite core 64 and three coils 65, 66, and 67 wound round the core 64. The coils 65 to 67 are, as can be seen from the equivalent circuit of FIG. 4, connected to a common terminal 63a and also to an X-axis terminal 63b, a Y-axis terminal 63c, and a Z-axis terminal 63d, respectively. The coils 65 to 67 work an antenna elements and will also be referred to as an X-axis antenna 65, a Y-axis antenna 66, and a Z-axis antenna 67 below.

The antenna unit 6, as described above, includes the ferrite core 64 and the three coils 65 to 67 and is relatively heavy in weight. Therefore, if the user drops the transmitter 1 accidentally, so that the casing (i.e., the upper and lower covers 2 and 9) of the transmitter 1 undergoes physical impact, it causes the antenna unit 6 to be subjected to a great impact or acceleration, which may result in detachment of the terminals 63a to 63d from the substrate 5 or, in the worst case, breakage of the ferrite core 64 and the coils 65 to 67.

In order to alleviate the above drawbacks, the transmitter 1 has the protective cushion 7 disposed between the package surface 61 of the antenna unit 6 and the inner wall 94 of the lower cover 9 to absorb the physical impact acting on the antenna unit 6.

Specifically, the protective cushion 7 is made of silicone rubber and has a Shore hardness of approximately 40. The cushion 7, as clearly shown in FIG. 5(a), includes a mount base 74 and dampers 71a, 71b, 71c, and 71d formed integrally with the mount base 74 symmetrically about the center P2 of the mount base 74. The mount base 74 has a square plate portion having a thickness of 0.5 mm. The damper 71a extends parallel to the damper 71c. Similarly, the damper 71b extends parallel to the damper 71d.

Figure 5:
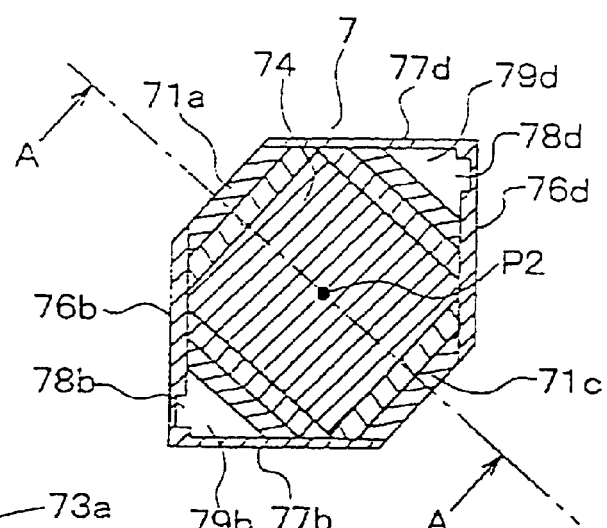
FIG. 5(a) is a top view which shows a protective cushion.
FIG. 5(b) is a side view of FIG. 5(a)
Figure 5:
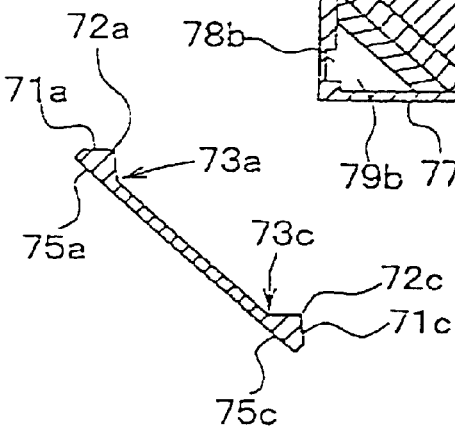
Figure 6:
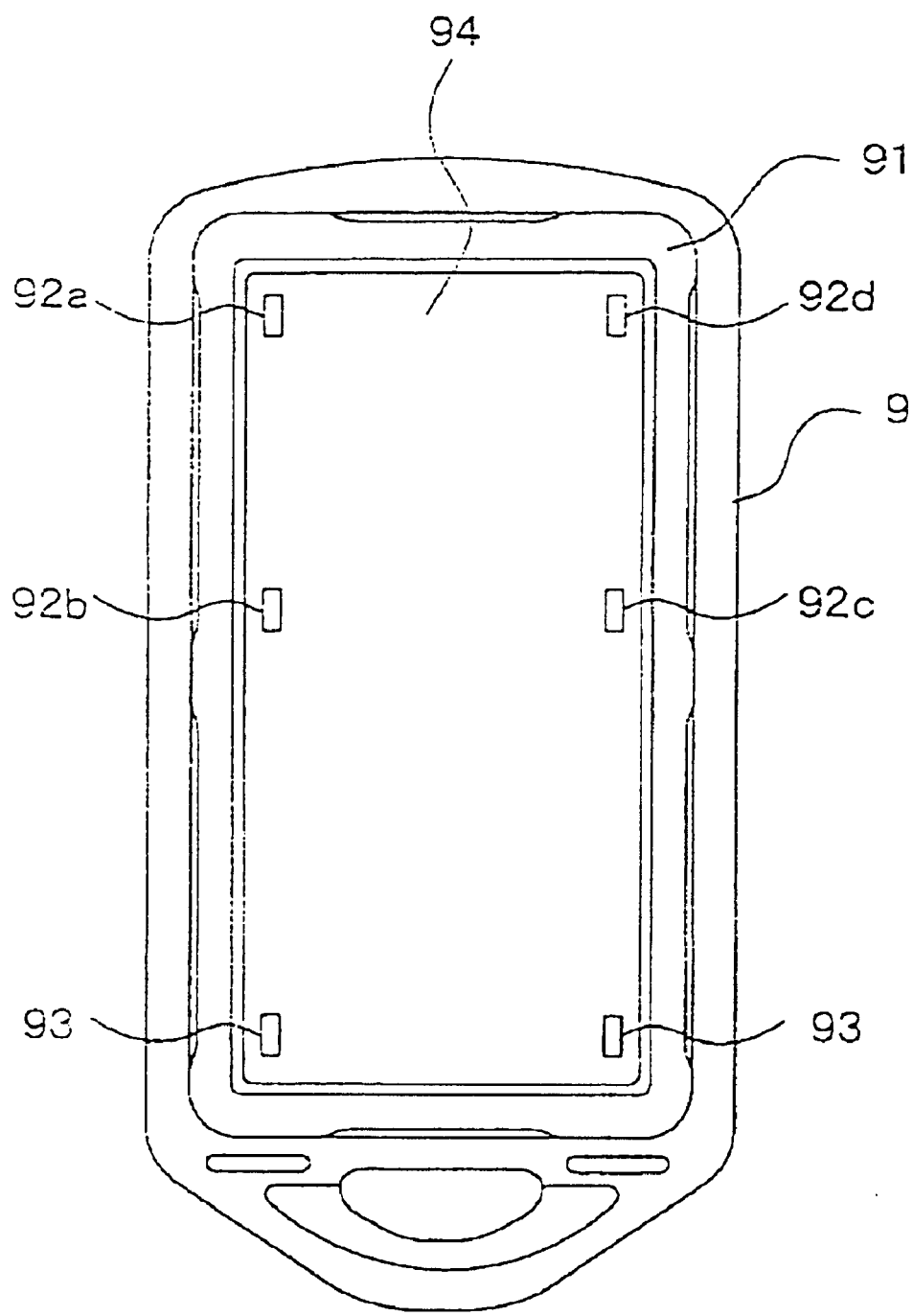
FIG. 6 is a top view which shows a lower case of the transmitter of FIG. 1.

The dampers 71a to 71d are each of an isosceles triangular shape in cross section which has a height of 1.6 mm and a base of 1.6 m and include, as shown in FIG. 5(b), first contacts 72a to 72d (only 72a and 72c are shown for the brevity of illustration) and second contacts 75a to 75d (only 75a and 75c are shown for the brevity of illustration). The first contacts 72a to 72d are defined by apexes of the isosceles triangles, respectively. The second contacts 75a to 75d are formed on the bottom of the mount base 74 and extend parallel to bases 73a to 73d of the isosceles triangles. Specifically, the second contacts 75a to 75d are affixed to the bases 73a to 73d of the isosceles triangles and each have a rectangular area of 1.6 mm×0.3 mm.

The mount base 74 has a square area of 0.5 mm in thickness surrounded by the dampers 71a to 71d and is installed within the lower cover 9 in contact of the bottom thereof (i.e., the lower surface as viewed in FIG. 5(b)) with the inner wall 94, as illustrated in FIG. 2, of the lower cover 9 so that the second contacts 75a to 75b are fixed on the inner wall 94.

The cushion 7 also includes frame members 76b, 76d, 77b, and 77d extending outside the dampers 71a to 71d at substantially the same level with that of the first contacts 72a to 72d. The frame member 76b is oriented substantially parallel to the frame member 76d. Similarly, the frame member 77b is oriented substantially parallel to the frame member 77d.

The frame members 76b and 76d opposed to each other are greater in thickness than the frame members 77b and 77d. The frame members 76b and 76d have formed therein recesses 78b and 78d facing openings 79b and 79d, respectively. Within the recesses 78b and 78d, substrate supports 92b and 92d of the lower cover 9, as will be described later in detail, are fitted in installation of the cushion 7 to hold the cushion 7 firmly within the lower cover 9.

The lower cover 9, as described above, has formed in the periphery thereof the groove 91 which forms a nip together with the protrusion 22 of the upper cover 2 within which the O-ring 40 of the waterproof cover 4 is placed in the assembling of the transmitter 1. The lower cover 9 also has the inner wall 94 which is lower in level than the groove 91 and oriented parallel to the surface of the substrate 5 when the transmitter 1 is assembled The lower cover 9 also has substrate supports 92a, 92c, and 93 in addition to the above described substrate supports 92b and 92d which work to support or hold the substrate 5 parallel to the inner wall 94 with a constant gap therebetween.

In the assembling of the transmitter 1, the substrate supports 92b and 92d are first placed within the openings 79b and 79d of the cushion 7 and fitted in the recesses 78b and 78d, respectively, to bring the bottom surface of the mount base 74, especially the second contacts 75a to 75d into close contact with the inner wall 94 of the lower cover 9. Next, the button panel 3 and the waterproof cover 4 are installed in the upper cover 2. Subsequently, the substrate 5 on which the button battery 83 is already placed is disposed in the upper cover 2. The upper cover 2 is fitted to the lower cover 9 in which the cushion 7 is already installed.

In the above assembling, the center P2 of the cushion 7, as shown in FIG. 5(a), is placed substantially in coincidence with the center P1 of the package surface 61 of the antenna unit 6, as shown in FIG. 3(a), on the inner wall 94 of the lower cover 9.

The O-ring 40 of the waterproof cover 4 is elastically deformed or compressed by firm engagement of the protrusion 22 of the upper cover 2 with the groove 91 of the lower cover 9 to prohibit intrusion of moisture into the transmitter 1. The O-ring 40 is so designed that a reaction force arises from the compression of the O-ring 40 which is approximately 2 N (Newton) to bring a compression ratio of the O-ring 40 to within a range of 20% to 30% in terms of surface roughness of the O-ring 40 and/or general use of the transmitter 1.

After the installation of the cushion 7, the dampers 71a to 71d abut to four corners of the package of the antenna unit 6 symmetrical with respect to the center P1 and are compressed elastically by the package surface 61 and the inner wall 94 of the lower cover 9. The degree to which the dampers 71a to 71d are compressed, which will also be referred to as a compression amount a below, is selected to be approximately 1 mm when the reaction force produced by the cushion 7 balances with that produced by the O-ring 40.

As apparent from the above discussion, the dampers 71a to 71d of the cushion 7 are placed within the lower cover 9 symmetrically about the center P1 of the package surface 61 of the antenna unit 6 as well as the P2 of the mount base 74 and compressed by equal amounts near the terminals 63a to 63b of the antenna unit 6 soldered to the substrate 5 to exert substantially the same pressure on the terminals 63a to 63b, thereby avoiding detachment of the terminals 63a to 63b from the substrate 5.

How to determine the compression amount a of the damper 71a to 71d will be described below in detail. In the following discussion, the dampers 71a to 71d will be generally referred to using reference number 71. The same applies to other parts.

The dampers 71 are required to meet the following three conditions:

1. the dampers 71 is resistible to buckling when compressed (because the buckling precludes the dampers 71 from producing elastic pressure to protect the antenna unit 6 from accidental impact).
2. the dampers 71 produce uniform elastic pressures acting on the terminals 63a to 63d of the antenna unit 6 (because nonuniformity in the elastic pressure among the dampers 71 may result in detachment some of the terminals 63a to 64d from the substrate 5).

3. the dampers 71 do not produce reaction force that exceeds that produced by the O-ring 40 (in order to ensure waterproofing property of the O-ring 40).

The first condition (i.e., avoidance of buckling of the dampers 71) is satisfied by the configuration of each of the dampers 71 in which a transverse section of the damper 71 is axi-symmetric, that is, it is of an isosceles triangular shape, and each of the first contacts 72a to 72d which is sharp is provided at the apex of the isosceles triangle. The transverse section of the dampers 71 may alternatively be circular or semi-circular.

The second condition is satisfied by the sectional configuration of the dampers 71 which minimizes a variation in reaction force of the dampers 71 produced when compressed for a variation in gap between the package surface 61 of the antenna unit 6 and the inner wall 94 of the lower cover 9 caused by an error in assembling of the transmitter 1. This assembling error usually arises from a variation in flatness of the substrate 5, an error in soldering the terminals 63a to 63d to the substrate 5, and/or a variation in shape of the cushion 7.

The third condition is satisfied by bringing the reaction force produced by the dampers 71 into agreement with a value that is substantially identical with the reaction force produced by the O-ring 40 (e.g., about 2 N).

Figures 7A, 7B:
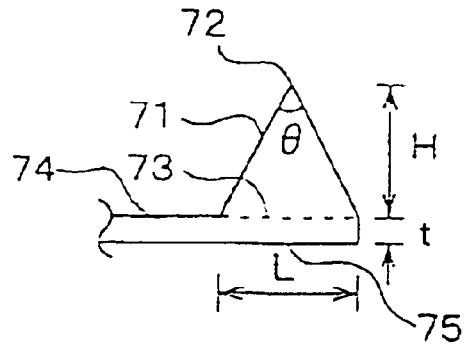
FIG. 7(a) is a partial sectional view which shows a damper of a protective cushion.
FIG. 7(b) is a table which shows geometries of three types of protective cushions.
Figure 8:
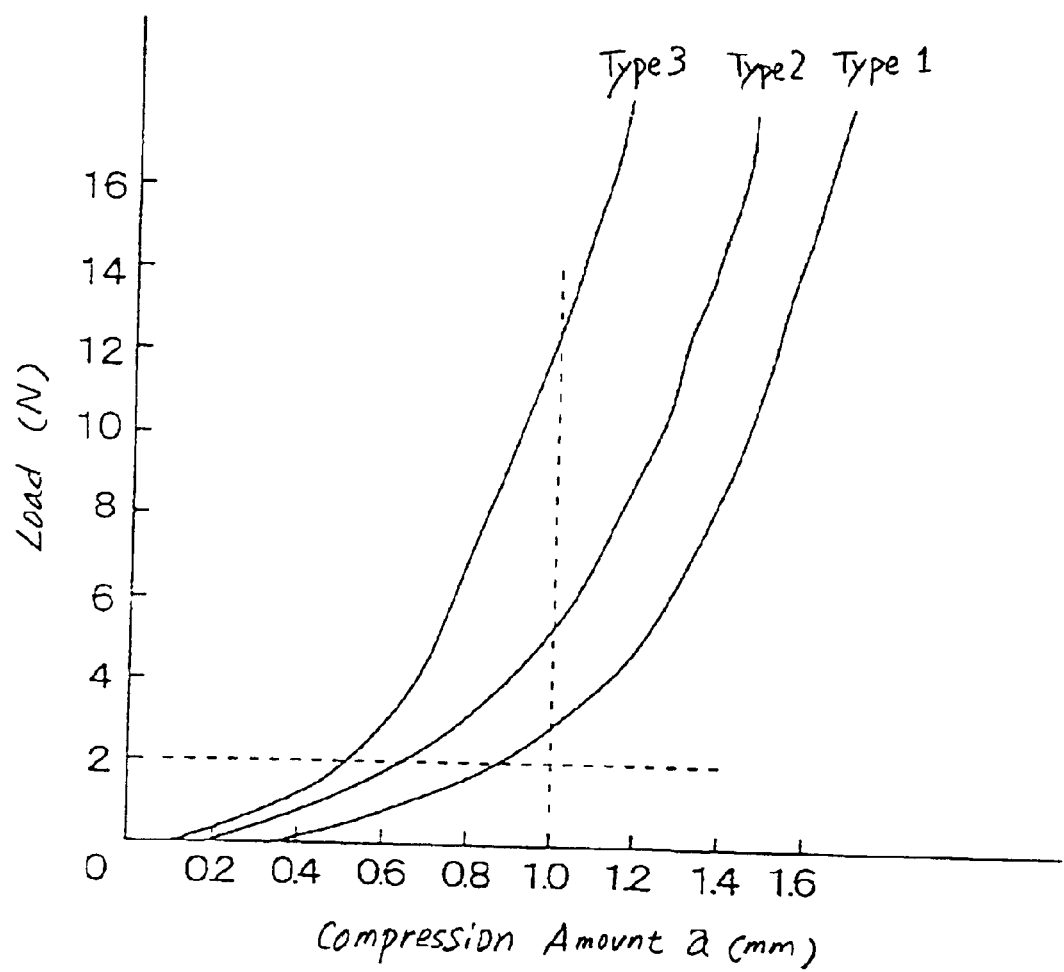
FIG. 8 is a graph which shows a relationship between a load N applied to each of the first to third types of cushions, as indicated in FIG. 7(b), and a resultant compression amount a of a damper.

Specific geometries of the dampers 71 will be described below in detail. FIG. 7(a) shows a transverse section of each of the dampers 71 of the cushion 7. FIG. 7(b) is a table listing the height H and the length L of the base of the isosceles triangle, as illustrated in FIG. 7(a), and the thickness t of the mount base 74 of three types of cushions 7. We investigated the relationship between a load N applied to each of the first to third types of cushions 7 and a resultant compression amount a of the damper 71. FIG. 8 demonstrates such relationships.

The graph of FIG. 8 shows that the smaller the apical angle θ of the isosceles triangle defining the first contact 72, the smaller will be the load N required to establish the same compression amount a of the damper 71. However, too small the apical angle θ results in buckling of the dampers 71 when the antenna unit 6 is mounted in the cushion 7 as well as a difficulty in keeping a desired production accuracy of the dampers 71. The apical angle θ is preferably selected to be within a range of 45° to 60° in terms of the buckling of the dampers 71.

In this embodiment, the first type of cushion 7 (i.e., the height H is 1.6 mm, the length L of the base is 1.6 mm, and the apical angle θ is 53.1°) is selected which meets the first to third conditions, as described above, and produces a reaction force of 2 to 3 N when the compression amount a of the dampers 71 is 1 mm. Specifically, when subjected to no load, the dampers 71 each have an overall height H+t= 1.6+0.5=2.1 mm. Thus, if the dampers 71 are compressed by 1 mm, a resultant height of the dampers 71 will be 1.1 mm.

As already described, the substrate 5 has the upper surface surrounded by the waterproof cover 4. The O-ring 40 is placed in a nip formed by the upper and lower covers 2 and 9 to provide hermetic sealing between the lower cover 9 and the waterproof cover 4 to avoid intrusion of moisture into a chamber defined by the waterproof cover 4 and the lower cover 9. The cushion 7 is made of a silicone rubber and disposed within a parallel rectangular chamber defined in the lower cover 9 in elastic abutment of the first contacts 72 with the surface of the antenna unit 6 mounted on the lower surface of the substrate 5 and the second contacts 75 with the inner wall 94 of the lower cover 9 to absorb physical impact transmitted to the antenna unit 6 which is produced, for example, when the user drops the transmitter 1 accidentally, thereby avoiding the detachment of the antenna unit 6 from the substrate 5 and/or breakage of the antenna unit 6 itself.

The dampers 71 of the cushion 7 are placed within the lower cover 9 symmetrically, like the terminals 63, about the center P1 of the package surface 61 of the antenna unit 6 in elastic abutment of the first contacts 72 with the antenna unit 6 near the terminals 63 soldered to the substrate 5 to exert substantially the same pressure on the terminals 63, thereby avoiding detachment of the terminals 63 from the substrate 5.

Each of the dampers 71 has a transverse section which is axi-symmetric, that is, it is of an isosceles triangular shape. The first contacts 72 are sharp and each defined at the apex of the isosceles triangle. The first contacts 72 are placed in elastic abutment with the package surface 61 of the antenna unit 6 at locations defined symmetrically with respect to the centers P1 and P2. The second contacts 75 are placed in elastic abutment with the inner wall 94 of the lower cover 9 extending parallel to the package surface 61 at locations defined symmetrically with respect to the centers P1 and P2. This arrangement establishes a small variation in reaction force produced by the dampers 71 for the compression amount a of the dampers 71. Thus, even if the interval between the package surface 61 and the inner wall 94 of the lower cover 9 is nonuniform, a difference between pressures acting on the dampers 71 to compress them is small, thus exerting substantially the same elastic pressures (i.e., the reaction forces produced by the dampers 71) on the antenna terminals 63.

The Shore hardness of the silicone rubber of the cushion 7 is selected to be 40 in the above embodiment, but may be within a range of 30 to 50 which ensures a desired impact absorbing ability.

The apical angle θ of the isosceles triangle defining the first contact 72 is preferably within a range of 45° to 60° which ensures a small variation in reaction force sufficient to protect the antenna unit 6 from accidental physical impact.

The thickness t mount base 74 of the cushion 7 is, as described above, 0.5 mm, but however, may be within a range of 0.1 mm to 0.5 mm which permits geometrical parameters (i.e., the height H, the length L, and compression amount a) of the dampers 71 to be selected using the relations, as illustrated in FIG. 8, which satisfy the above described first to third conditions.

Figure 9A:
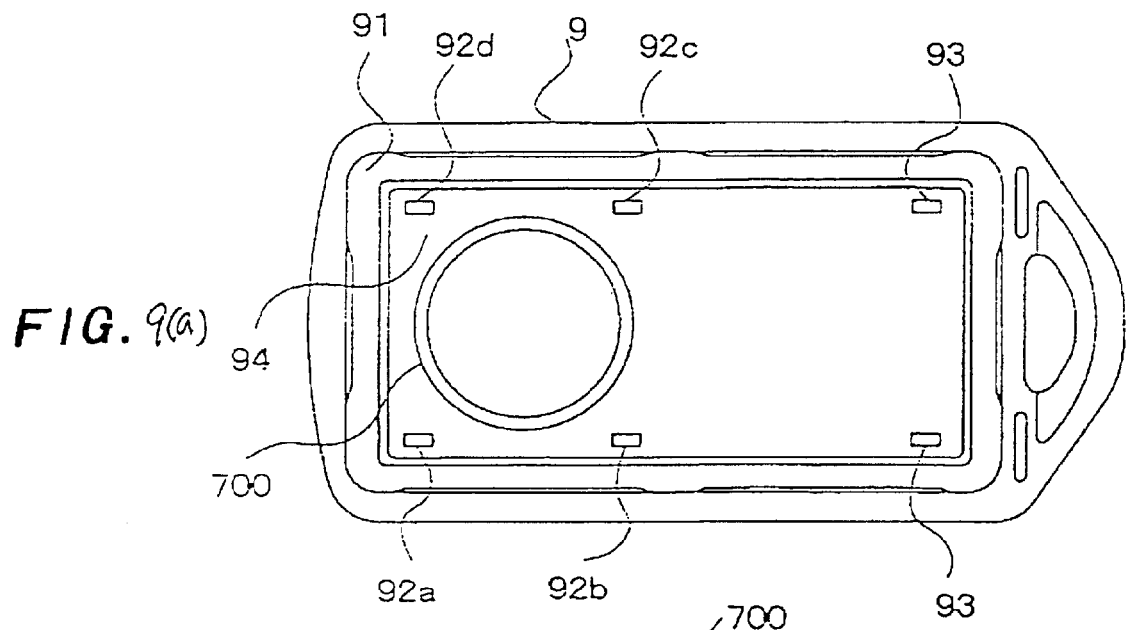
FIG. 9(a) is a top view which shows a protective cushion in a first modified form.

The cushion 7 is substantially square similar to the package of the antenna unit 6, but may be implemented by a commercially available O-ring 700, as shown in FIG. 9(a), which is circular in cross section. The O-ring 700 must be selected to have the diameter slightly smaller than the length of sides of the package of the antenna 6 and placed within the lower cover 9 in coincidence of the center of the O-ring 700 with the center P1 of the antenna surface 61. This causes the first contacts 72 and the second contacts 75 defined on the periphery of a cross section of the O-ring 700 to work to exert substantially the same elastic pressures on portions of the package surface 61 which are symmetrical about the center P1 of the package surface 61 and close to the antenna terminals 63a to 63d of the antenna 6.

Figure 9B:
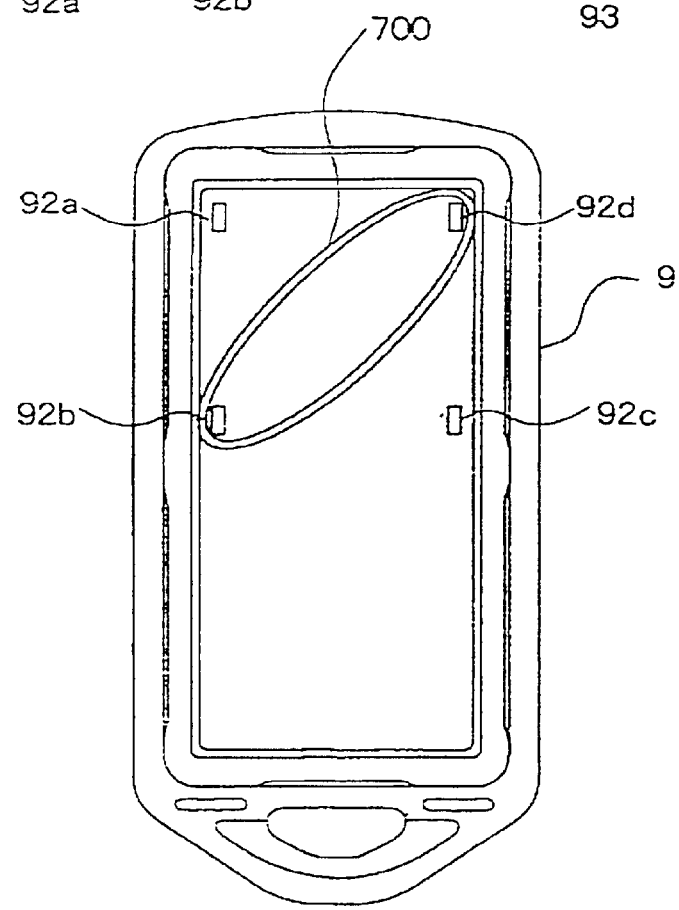
FIG. 9(b) is a top view which shows a protective cushion in a second modified form.

The O-ring 700 may alternatively be, as shown in FIG. 9(b), wound on diametrically opposed two of the substrate supports 92a to 92d (e.g., the substrate supports 92b and 92d in the illustrated case).

An elastic reaction force produced by a nip formed by the package surface 61 of the antenna unit 6 and the inner wall 94 of the lower cover 9 in which the cushion 7 is disposed must be lower than an elastic reaction force produced by a nip formed by the first and second covers 2 and 9 in which the O-ring 40 of the waterproof cover 4 is disposed in order to ensure tight engagement between the upper and lower covers 2 and 9.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims. For instance, the second contacts 75 may be shaped to be sharp similar to the first contacts 72. Alternatively, the cushion 7 may be put upside down. Specifically, the first contacts 72 may be placed in elastic abutment to the inner wall 94 of the lower cover 9, while the second contacts 75 may be placed in elastic abutment to the package surface 61 of the antenna 6.

What is claimed is:

1. A protective cushion for a portable unit which includes a casing having an inner surface, a substrate disposed within the casing on which an electric circuit is mounted, and an antenna unit disposed within said casing which includes a package, the package having a first and a second surface, the first surface extending parallel to a surface of said substrate, the second surface extending parallel to the inner surface of said casing, the package being affixed to the surface of said substrate at a plurality of joints provided symmetrically with respect to a preselected point defined on the first surface of the package, comprising:

dampers made of an elastic material which work to absorb physical impact transmitted to the antenna unit;

first contacts provided on said dampers, respectively, the first contacts abutting to the second surface of the package of the antenna unit at locations defined symmetrically with respect to the preselected point; and second contacts provided on said dampers, said second contacts abutting to the inner surface of the casing.

2. A protective cushion as set forth in claim 1, wherein each of said dampers has a sectional area which is geometrically symmetric with respect to a center line of said damper extending through the first and second contacts when no load is applied to the damper.

3. A protective cushion as set forth in claim 1, wherein said second contacts abut to the inner surface of the casing at locations defined symmetrically with respect to the preselected point.

4. A protective cushion as set forth in claim 2, wherein at least one of a set of said first contacts and a set of said second contacts geometrically defines one of a first configuration and a second configuration, the first configuration being circular, the second configuration having a first pair of sides extending parallel to each other and a second pair of sides extending parallel to each other on a plane extending perpendicular to the center line.

5. A protective cushion as set forth in claim 1, wherein each of said dampers is of an isosceles triangular shape in cross section, and each of the first contacts is defined by an apex of the isosceles triangular shape.

6. A protective cushion as set forth in claim 5, further comprising a parallel mount plate placed in abutment with one of the second surface of the package and the inner surface of said casing, and wherein the second contacts are formed integrally with the mount plate.

7. A protective cushion as set forth in claim 5, wherein an apical angle the isosceles triangular shape lies within a range of 45° to 60°.

8. A protective cushion as set forth in claim 1, wherein said dampers and said first and second contacts are formed by an elastic member which is made of a silicone rubber having a Shore harness lying within a range of 30 to 50.

9. A protective cushion as set forth in claim 1, wherein the casing is made up of a first and a second cover, the second cover having the inner surface on an inner wall thereof, the first and second covers being fitted tightly to each other at peripheries thereof to form a nip in which a waterproof seal is so disposed as to produce an elastic reaction force, and wherein said dampers are disposed in a nip formed by the second surface of the package and the inner surface of the casing so as to produce an elastic reaction force which is lower than the elastic reaction force produced by the waterproof seal.

10. A protective cushion as set forth in claim 1, wherein said dampers and said first and second contacts are formed by an elastic member implemented by an O-ring.

11. A portable unit comprising:

a casing having an inner surface:

a substrate disposed within said casing on which an electric circuit is mounted:

an antenna unit disposed within said casing, said antenna unit including a package, the package having a first and a second surface, the first surface extending parallel to a surface of said substrate, the second surface extending parallel to the inner surface of said casing, the package being affixed to the surface of said substrate at a plurality of joints provided symmetrically with respect to a preselected point defined on the first surface of the package; and a cushion disposed within said casing to absorb physical impact transmitted to said antenna, said cushion being made of an elastic material and equipped with dampers each of which has a first contact and a second contact, the first contacts abutting to the second surface of the package of said antenna unit at locations defined symmetrically with respect to the preselected point, the second contacts abutting to the inner surface of said casing.

12. A portable unit as set forth in claim 11, wherein each of said dampers has a sectional area which is geometrically axi-symmetric when no load is applied to the damper.

13. A portable unit as set forth in claim 11, wherein said second contacts abut to the inner surface of said casing at locations defined symmetrically with respect to the preselected point.

14. A portable unit as set forth in claim 11, wherein each of said dampers is of an isosceles triangular shape in cross section, and each of the first contacts is defined by an apex of the isosceles triangular shape.

15. A portable unit as set forth in claim 14, wherein said cushion has a parallel mount plate placed in abutment with one of the second surface of the package and the inner surface of said casing, and wherein the second contacts are formed integrally with the mount plate.

16. A portable unit as set forth in claim 14, wherein an apical angle the isosceles triangular shape lies within a range of 45° to 60°.

17. A portable unit as set forth in claim 11, wherein said cushion is made of a silicone rubber which has a Shore harness lying within a range of 30 to 50.

18. A protective cushion as set forth in claim 11, wherein said casing is made up of a first and a second cover, the second cover having the inner surface on an inner wall thereof, the first and second covers being fitted tightly to each other at peripheries thereof to form a nip in which a waterproof seal is so disposed as to produce an elastic reaction force, and wherein said dampers are disposed in a nip formed by the second surface of the package and the inner surface of the casing so as to produce an elastic reaction force which is lower than the elastic reaction force produced by the waterproof seal.

19. A protective cushion as set forth in claim 11, wherein said dampers are formed by an elastic member implemented by an O-ring.

\* \* \* \* \*